(12) United States Patent
Katsukura

(10) Patent No.: US 12,398,901 B2
(45) Date of Patent: Aug. 26, 2025

(54) AIR CONDITIONING SYSTEM, OPERATION TERMINAL, AND NON-TRANSITORY COMPUTER-READABLE STORAGE MEDIUM

(71) Applicant: Mitsubishi Electric Corporation, Tokyo (JP)

(72) Inventor: Makoto Katsukura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 403 days.

(21) Appl. No.: 17/793,851

(22) PCT Filed: Mar. 27, 2020

(86) PCT No.: PCT/JP2020/014027
§ 371 (c)(1),
(2) Date: Jul. 19, 2022

(87) PCT Pub. No.: WO2021/192222
PCT Pub. Date: Sep. 30, 2021

(65) Prior Publication Data
US 2023/0046536 A1 Feb. 16, 2023

(51) Int. Cl.
*H04W 64/00* (2009.01)
*F24F 11/56* (2018.01)
(Continued)

(52) U.S. Cl.
CPC .............. *F24F 11/56* (2018.01); *F24F 11/63* (2018.01); *H04W 4/02* (2013.01); *H04W 64/00* (2013.01); *F24F 11/50* (2018.01)

(58) Field of Classification Search
USPC ....................................................... 700/276
See application file for complete search history.

(56) References Cited

U.S. PATENT DOCUMENTS

2012/0069178 A1* 3/2012 Nielsen ................. H04N 7/183
348/135
2014/0011518 A1* 1/2014 Valaee ................ G01S 5/02526
455/456.1
(Continued)

FOREIGN PATENT DOCUMENTS

JP 2011-075138 A 4/2011
JP 2017-117364 A 6/2017
WO 2017/098589 A1 6/2017

OTHER PUBLICATIONS

Chiu et al., "Spatial Skeleton-enhanced Location Tracking for Indoor Localization" 2017 IEEE Wireless Communications and Networking Conference (WCNC), Mar. 19-22, 2017, 6 pgs., (Year: 2017).*

(Continued)

*Primary Examiner* — Emilio J Saavedra
(74) *Attorney, Agent, or Firm* — Posz Law Group, PLC

(57) ABSTRACT

An air conditioning system having a plurality of air conditioners installed in a predetermined place and an operation terminal to communicate with the air conditioners, wherein each of the air conditioners includes a first radio communication unit to send a beacon signal, the operation terminal includes a local terminal communication unit to receive two or more beacon signals send by two or more air conditioners of the air conditioners; a location presumption unit to presume a current location by using two or more radio wave intensities measured from each of the two or more beacon signals and a last location, the current location being a location in which the operation terminal is currently located, the last location being a location presumed last as a location of the operation terminal.

13 Claims, 10 Drawing Sheets

(51) Int. Cl.
    *F24F 11/63*     (2018.01)
    *H04W 4/02*     (2018.01)
    *F24F 11/50*     (2018.01)

(56) References Cited

U.S. PATENT DOCUMENTS

| | | | |
|---|---|---|---|
| 2020/0072487 A1* | 3/2020 | Fujiwara | F24F 11/52 |
| 2020/0228924 A1* | 7/2020 | Lelkens | G01S 5/021 |
| 2021/0048214 A1* | 2/2021 | Hediger | G05D 23/1917 |
| 2021/0312403 A1* | 10/2021 | Chappa | G06Q 10/02 |
| 2022/0377696 A1* | 11/2022 | Park | G01S 5/06 |

OTHER PUBLICATIONS

International Search Report of the International Searching Authority mailed Aug. 4, 2020 in corresponding application No. PCT/JP2020/014027 (and English translation).
Chiu, C.J. et al., "Spatial Skeleton-Enhanced Location Tracking for Indoor Localization", IEEE Wireless Communications and Networking Conference (WCNC), Mar. 19, 2017, pp. 1-6, XP033095670.
Office Action issued Feb. 12, 2024 in counterpart European Patent Application No. 20926929.9.
Office Action dated Jul. 22, 2024 issued in corresponding European Patent Application No. 20926929.9.
Extended European Search Report issued Mar. 14, 2023 in connection with counterpart European Patent Application No. 20926929.9.

\* cited by examiner

AIR CONDITIONING SYSTEM, OPERATION TERMINAL, AND NON-TRANSITORY COMPUTER-READABLE STORAGE MEDIUM

TECHNICAL FIELD

The present invention relates to an air conditioning system, an operation terminal, and a non-transitory computer-readable storage medium.

BACKGROUND ART

In recent years, new workplace designs such as free-address offices and activity-based working (ABW) have become popular. Workers such as employees work while moving around the floor over time. This is a very different way of working than in the past, when employees had fixed seats in each department.

As for air conditioning, in the past, it was sufficient to change the temperature setting of the air conditioner installed in the department where the user is present, but at a workplace such as that described above, it is necessary for the user to confirm the air conditioner installed at the location where the user is present before checking the content of the settings and operating the air conditioner. However, such operation is very inconvenient for the user.

On the other hand, there is a technique for controlling air conditioning by location information of a user and by inputting sensory information, such as hot or cold, from a terminal held by the user (for example, refer to Patent Reference 1).

PATENT REFERENCE

Patent Literature 1: WO 2017-098589

However, in the technique described in Patent Literature 1, it is necessary to obtain the location information of the user by input by the user or on the basis of the principle of three-point surveying by using a positioning system, such as global positioning system (GPS).

It is very troublesome for the user to input the location information. Alternatively, in general, it is difficult to accurately presume a location through three-point surveying because of the influence of multipath propagation, such as radio reflection, in indoor environments.

SUMMARY

Accordingly, it is an object of one or more aspects of the disclosure to readily specify the location of a user of an air conditioner.

An air conditioning system according to an aspect of the disclosure having a plurality of air conditioners installed in a predetermined place and an operation terminal configured to communicate with the air conditioners by radio signals, wherein each of the air conditioners comprises a first radio communication unit configured to send a beacon signal, the operation terminal comprises: a second radio communication unit configured to receive two or more beacon signals send by two or more air conditioners of the air conditioners; and a location presumption unit configured to presume a current location by using two or more radio wave intensities measured from each of the two or more beacon signals and a last location, the current location being a location in which the operation terminal is currently located, the last location being a location presumed last as a location of the operation terminal.

An operation terminal according to an aspect of the disclosure includes a radio communication unit configured to receive two or more beacon signals sent by two or more air conditioners installed in a predetermined place; and a location presumption unit configured to presume a current location in which the operation terminal is currently located by using two or more radio wave intensities measured from each of the two or more beacon signals and a last location presumed last as a location of the operation terminal.

A program according to an aspect of the disclosure causes a computer to function as: a radio communication unit configured to receive two or more beacon signals sent by two or more air conditioners installed in a predetermined place; and a location presumption unit configured to presume a current location in which the operation terminal is currently located by using two or more radio wave intensities measured from each of the two or more beacon signals and a last location presumed last as a location of the operation terminal.

According to one or more aspects of the disclosure, the location of a user of an air conditioner can be readily specified.

DETAILED DESCRIPTION

Figure 1:
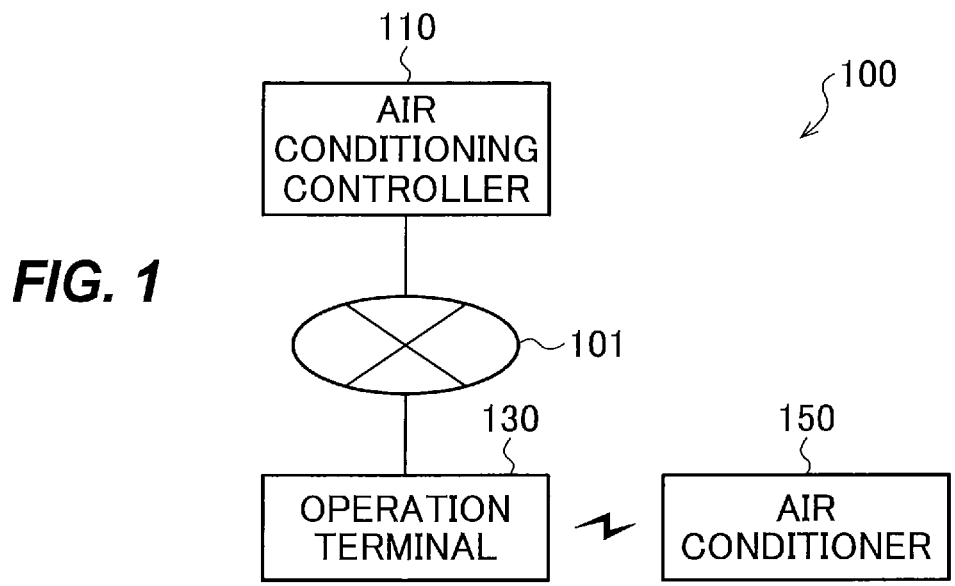
FIG. 1 is a block diagram schematically illustrating the configuration of an air conditioning system.

FIG. 1 is a block diagram schematically illustrating the configuration of an air conditioning system 100 according to an embodiment.

The air conditioning system 100 includes an air conditioning controller 110, operation terminals 130, and air conditioners 150.

In the air conditioning system 100, multiple air conditioners 150 can be installed in a predetermined place (for example, on a floor). Multiple users can use multiple operation terminals 130 to control the operation of the air conditioners 150.

In the air conditioning system 100, the air conditioners 150 are mounted on a floor in a workplace, such as a free-address office. A user at a workplace has an operation terminal 130 for operating the air conditioners 150. The operation terminal 130 is connected to the air conditioning controller 110 via a wide-area network 101, such as the Internet.

The air conditioners 150 operate at remote distances from the air conditioning controller 110. Many air conditioners 150 are installed on the floor, and a user can use an operation terminal 130 to control any of the air conditioners 150 within the range of radio waves. Each of the air conditioners 150 has a unique ID, which is identification information for identifying the air conditioner, and can be distinguished from each other by these unique IDs. The Ids are air conditioner identifiers for identifying the respective air conditioners 150.

An application program installed in the operation terminal 130 automatically confirms the IDs of the air conditioners 150 in the vicinity through a method described below, and operates these air conditioners 150 in the vicinity. At this time, the operation terminal 130 performs air conditioning control based on a user's temperature sensation.

The air conditioning controller 110 is, for example, a computer such as a server or a computing resource operating on a cloud. The operation terminal 130 is, for example, a smartphone and an application program running on the smartphone. The air conditioners 150 are, for example, indoor units for air conditioning.

Figure 2:
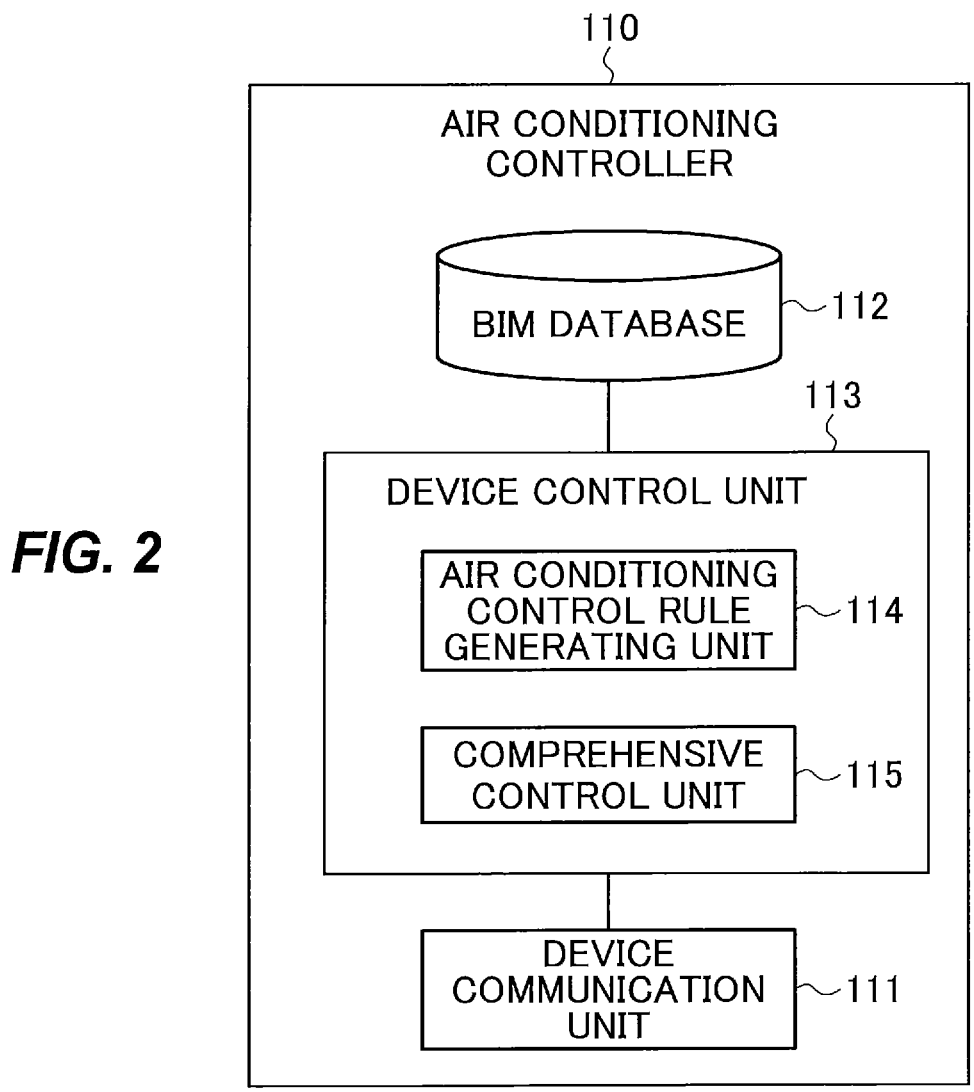
FIG. 2 is a block diagram schematically illustrating the configuration of an air conditioning controller.

FIG. 2 is a block diagram schematically illustrating the configuration of the air conditioning controller 110.

The air conditioning controller 110 includes a device communication unit 111, a building information modeling (BIM) database 112, and a device control unit 113.

The device communication unit 111 communicates with the operation terminal 130 via a wide-area network 101. For example, Transmission Control Protocol/Internet Protocol (TCP/IP) is used with the operation terminal 130. A firewall (not illustrated) is provided between the wide-area network 101 and the operation terminal 130. Thus, it is difficult to start communication with the operation terminal 130 from the air conditioning controller 110. On the other hand, it is easy to start communication with the air conditioning controller 110 from the operation terminal 130. Thus, the operation terminal 130 periodically accesses the air conditioning controller 110, sends a request to the air conditioning controller 110, acquires a request addressed to the operation terminal 130, and responds to the request. The device communication unit 111 receives the request for this purpose and sends a response. The device communication unit 111 is also referred to as a second communication unit.

The BIM database 112 is a layout information storage unit that stores layout information of the workplace where the air conditioner 150 is installed. Specifically, the layout information indicates the locations of walls, pillars, doors, the air conditioners 150, or ventilators. The layout information may include information regarding the types of the walls, the pillars, the doors, the air conditioners 150, or the ventilators.

The device control unit 113 controls the processing by the air conditioning controller 110.

The device control unit 113 includes an air conditioning control rule generating unit 114 and a comprehensive control unit 115.

The air conditioning control rule generating unit 114 is an air conditioning control content determination unit that determines the operation content of corresponding air conditioners 150 from the location information and the temperature sensation information sent by the operation terminals 130 held by various users at the workplace.

Specifically, the air conditioning control rule generating unit 114 divides the floor of the building into air conditioning areas by using the BIM database 112. Next, the air-conditioning-control rule generating unit 114 processes, for each air conditioning area, the temperature sensations from the users of the operation terminals 130 present in the divided air conditioning areas for each air conditioning area. For example, if there are three users in an air conditioning area, and the response by one user is "hot" and the response by the other two users is "cold," the collective response of the users in this air conditioning area is determined to be "cold." Accordingly, the air conditioning control rule generating unit 114 determines a control content, for example, for raising the set temperature of the corresponding air conditioning area by one degree, and generates a command indicating the control content. The generated command is sent to the operation terminals 130 in the corresponding air conditioning area, and the operation terminals 130 send a set temperature change command to the corresponding air conditioner 150.

The air conditioning control rule generating unit 114 repeats these operations at predetermined time intervals, for example, 10-minute intervals.

The comprehensive control unit 115 performs comprehensive control of the air conditioning controller 110.

For example, the comprehensive control unit 115 receives a request from an operation terminal 130, processes the request, and responds to the request. The comprehensive control unit 115 also transfers an air conditioning control rule generated by the air conditioning control rule generating unit 114 to the operation terminal 130 via the device communication unit 111.

Figure 3A:
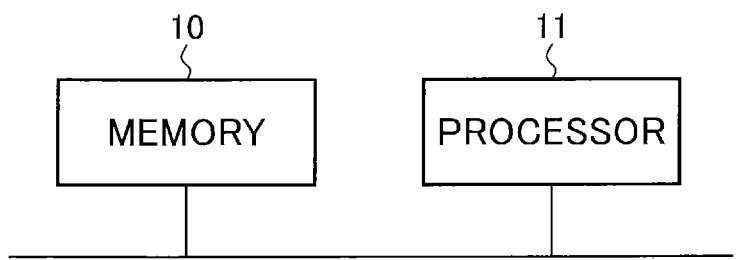
FIGS. 3A and 3B are block diagrams illustrating hardware configuration examples.

A portion or the entirety of the device control unit 113 described above can be implemented by, for example, a memory 10 and a processor 11, such as a central processing unit (CPU), that executes the programs stored in the memory 10, as illustrated in FIG. 3A. Such programs may be provided via a network or may be recorded and provided on a recording medium. That is, such programs may be provided as, for example, program products.

Figure 3B:
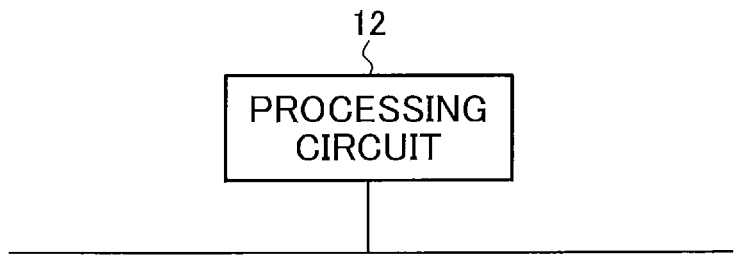

A portion or the entirety of the device control unit 113 can be implemented by, for example, a processing circuit 12, such as a single circuit, a composite circuit, a programmed processor, a parallel programmed processor, an application specific integrated circuit (ASIC), or a field programmable gate array (FPGA), as illustrated in FIG. 3B.

As described above, the device control unit 113 can be implemented by processing circuitry.

Note that the device communication unit 111 can be implemented by a communication device, such as a network interface card (NIC).

The BIM database 112 can be implemented by a storage device, such as a hard disk drive (HDD). The storage device functions as a storage unit.

Figure 4:
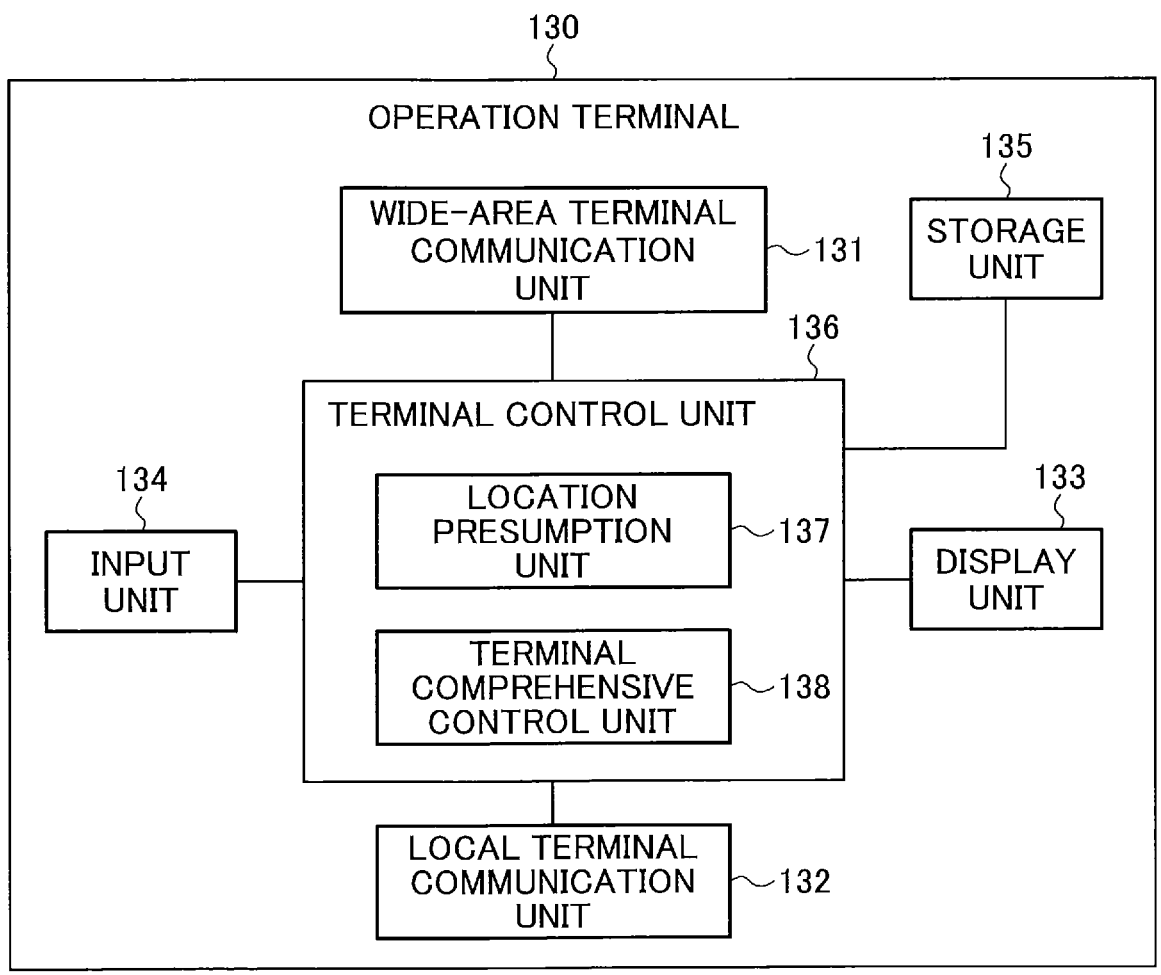
FIG. 4 is a block diagram schematically illustrating the configuration of an operation terminal.

FIG. 4 is a block diagram schematically illustrating the configuration of an operation terminal 130.

The operation terminal 130 includes a wide-area terminal communication unit 131, a local terminal communication unit 132, a display unit 133, an input unit 134, a storage unit 135, and a terminal control unit 136.

The wide-area terminal communication unit 131 communicates with the air conditioning controller 110 via the wide-area network 101. As described above, for example, TCP/IP is used as the communication protocol. The wide-area terminal communication unit 131 is also referred to as a first communication unit.

The local terminal communication unit 132 communicates with the air conditioners 150. For example, the local terminal communication unit 132 communicates with the air conditioners 150 by radio signals. Specifically, the local terminal communication unit 132 sends an operation instruction to the air conditioners 150 and receives status information indicating the current statuses of the air conditioners 150. For example, the local terminal communication unit 132 sets and acquires parameters such as the operating state, air volume, wind direction, or set temperature of the air conditioners 150. The local terminal communication unit 132 communicates by Bluetooth (registered trademark).

The local terminal communication unit 132 receives beacon signals from the air conditioners 150. The local terminal communication unit 132 gives the Ids included in the beacon signals to the terminal control unit 136, measures the radio wave intensity of the beacon signals, and gives the measured radio wave intensity to the terminal control unit 136.

The local terminal communication unit 132 may also be referred to as a second radio communication unit or simply a radio communication unit.

The display unit 133 displays a screen image. Specifically, the display unit 133 displays a screen image that displays a floor map of the floor where the user is staying, the locations of the air conditioners 150, the presumed location of the operation terminal 130 provided with the display unit 133, a circle indicating the presumption accuracy, the location and name of the user, the locations and names of other users, etc.

The input unit 134 accepts an input operation from the user. The user inputs the temperature sensation the user is currently feeling to the operation terminal 130. In specific, inputting the temperature sensation means to input the sensation that the user is feeling into the operation terminal 130 by pressing the button indicated as "hot" on the display unit 133 when the user is feeling hot, or pressing the button indicated as "cold" on the display unit 133 when the user feeling cold.

The storage unit 135 stores information necessary for the processing by the operation terminal 130.

For example, the storage unit 135 stores the user name of the user using the operation terminal 130. Moreover, the storage unit 135 stores information, such as floor information, downloaded from the air conditioning controller 110.

The terminal control unit 136 controls the processing by the operation terminal.

The terminal control unit 136 includes a location presumption unit 137 and a terminal comprehensive control unit 138.

The location presumption unit 137 presumes the current location of the operation terminal 130 from the radio wave intensity of the beacon signals received by the local terminal communication unit 132. A beacon signal is sent by an air conditioner 150, and the radio wave intensity of the beacon signal decreases as the distance from the air conditioner 150 increases. The location presumption unit 137 uses this property to calculate the relative distance to the air conditioner 150 from the radio wave intensity and presumes the current location, which is a location in which the operation terminal 130 is currently located.

Here, the location presumption unit 137 presumes the current location by using the radio wave intensity of the beacon signal and the last location, which is the location presumed last as the location of the operation terminal 130.

Specifically, the location presumption unit 137 sets multiple predetermined candidate locations within a predetermined range from the last location, selects one of the candidate locations at a distance to the air conditioner 150 best matching the radio wave intensity out of the multiple candidate locations, and presumes this candidate location as the current location. The method of setting the multiple candidate locations within the predetermined range may be any method, such as setting the candidate locations at random on a portion of the floor other than shielding objects, such as walls.

The location presumption unit 137 acquires floor information from the air conditioning controller 110 via the wide-area terminal communication unit 131, generates a screen image showing at least a portion of the floor that is a predetermined place and the presumed current location, and causes the display unit 133 to display the screen image. In the screen image, the user name of the user who is using the operation terminal 130 may be shown in association with the presumed current location. For example, the user name may be shown at the presumed current location or a location determined on the basis of the presumed current location.

Moreover, the location presumption unit 137 may acquire the user names of the users using other operation terminals 130 and the current locations of these users from the air conditioning controller 110 via the wide-area terminal communication unit 131 to show an acquired user name at the acquired current location in the screen image.

The location presumption unit 137 may show a presumption error of the presumed current location in the screen image.

For example, the location presumption unit 137 may specify the strongest radio wave intensity for each of the air conditioners 150 from the radio wave intensities measured from the beacon signals received by the local terminal communication unit 132 during a predetermined time period to generate a radio wave intensity group, and may show a circle representing the presumption error in the screen image in which the circle becomes larger as the difference obtained by subtracting the second strongest radio wave intensity from the strongest radio wave intensity in the radio wave intensity group becomes larger. The location presumption unit 137 generates a radio wave intensity group by specifying the strongest radio wave intensity for each of the air conditioners 150 from the radio wave intensities measured from the beacon signals received by the local terminal communication unit 132 during a predetermined time period, and performs a process of calculating the difference between each two consecutive radio wave intensities, up to the second strongest radio wave intensity, in the radio wave intensity group in which the radio wave intensities are arranged in descending order. The location presumption unit 137 may show, on the screen image, a circle representing the presumption error that becomes larger as the sum of all differences calculated in this way becomes larger.

Moreover, the location presumption unit 137 may acquire information indicating multiple air conditioning areas obtained by dividing the floor, which is a predetermined place, from the air conditioning controller 110 via the wide-area terminal communication unit 131, and may show at least one of the air conditioning areas in the screen image.

The terminal comprehensive control unit 138 comprehensively controls the operation terminal 130. Specifically, the terminal comprehensive control unit 138 interprets operation commands of the air conditioners 150 from the air conditioning controller 110 and controls the air conditioners 150 via the local terminal communication unit 132.

The terminal comprehensive control unit 138 functions as an operation control unit that controls the operation of the air conditioners 150. For example, the terminal comprehensive control unit 138 controls the operation of a corresponding air conditioner 150 in accordance with an instruction from the user or a control content determined by the air conditioning controller 110.

A portion or the entirety of the terminal control unit 136 described above can be implemented by, for example, a memory 10 and a processor 11, such as a CPU, that executes the programs stored in the memory 10, as illustrated in FIG. 3A. Such programs may be provided via a network or may be recorded and provided on a recording medium. That is, such programs may be provided as, for example, program products.

A portion or the entirety of the terminal control unit 136 can be implemented by, for example, a processing circuit 12, such as a single circuit, a composite circuit, a programmed processor, a parallel programmed processor, an ASIC, or an FPGA, as illustrated in FIG. 3B.

As described above, the terminal control unit 136 can be implemented by processing circuitry.

The wide-area terminal communication unit 131 can be implemented by a communication device such as an NIC.

The local terminal communication unit 132 can be implemented by a radio communication device that performs radio communication.

The display unit 133 and the input unit 134 can be implemented by, for example, a touch screen. Alternatively, the display unit 133 may be implemented by a display, and the input unit 134 may be implemented by an input device.

The storage unit 135 can be implemented by a storage device, such as a non-volatile memory.

Figure 5:
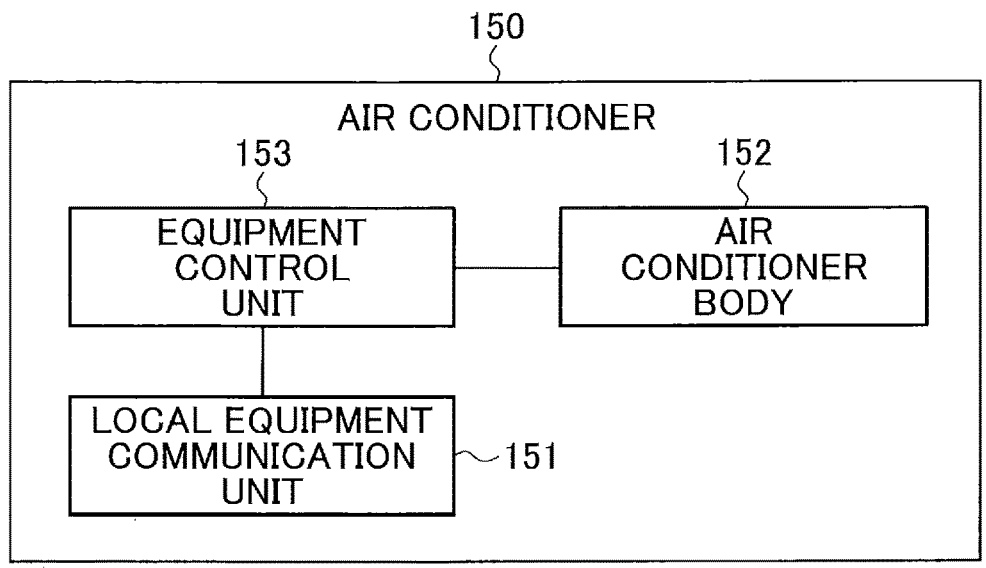
FIG. 5 is a block diagram schematically illustrating the configuration of an air conditioner.

FIG. 5 is a block diagram schematically illustrating the configuration of an air conditioner 150.

The air conditioner 150 includes a local equipment communication unit 151, an air conditioner body 152, and an equipment control unit 153.

The local equipment communication unit 151 communicates with the operation terminals 130. For example, the local equipment communication unit 151 communicates with the operation terminals 130 by radio signals. Specifically, the local equipment communication unit 151 receives an operation instruction in response to a request from an operation terminal 130 and sends status information indicating the current status of the air conditioner 150.

The local equipment communication unit 151 functions as a radio beacon transmission unit that periodically sends a beacon signal. A beacon signal includes ID information indicating the ID of the air conditioner 150. The operation terminals 130 can receive such a beacon signal and extract the ID information.

The local equipment communication unit 151 is also referred to as a first radio communication unit.

The air conditioner body 152 performs air conditioning of the floor that is a space in which the air conditioner 150 is installed. For example, the air conditioner body 152 warms or cools the intake air in response to an instruction from an operation terminal 130. Specifically, the air conditioner body 152 warms the air during a heating operation and cools the air during a cooling operation. The air conditioner body 152 includes, for example, a compressor, a condenser, an evaporator, an expansion valve, etc.

The equipment control unit 153 comprehensively controls the air conditioner 150. Specifically, the equipment control unit 153 controls the fan, the expansion valve of a refrigerant, etc., included in the air conditioner body 152 to achieve the cooling operation or the heating operation. As a result, the air is cooled or warmed so that the temperature of the air in the room reaches a set temperature.

A portion or the entirety of the equipment control unit 153 described above can be implemented by, for example, a memory 10 and a processor 11, such as a CPU, that executes the programs stored in the memory 10, as illustrated in FIG. 3A. Such programs may be provided via a network or may be recorded and provided on a recording medium. That is, such programs may be provided as, for example, program products.

A portion or the entirety of the equipment control unit 153 can be implemented by, for example, a processing circuit 12, such as a single circuit, a composite circuit, a programmed processor, a parallel programmed processor, an ASIC, or an FPGA, as illustrated in FIG. 3B.

As described above, the equipment control unit 153 can be implemented by processing circuitry.

The local equipment communication unit 151 can be implemented by a radio communication device that performs radio communication.

Figure 6:
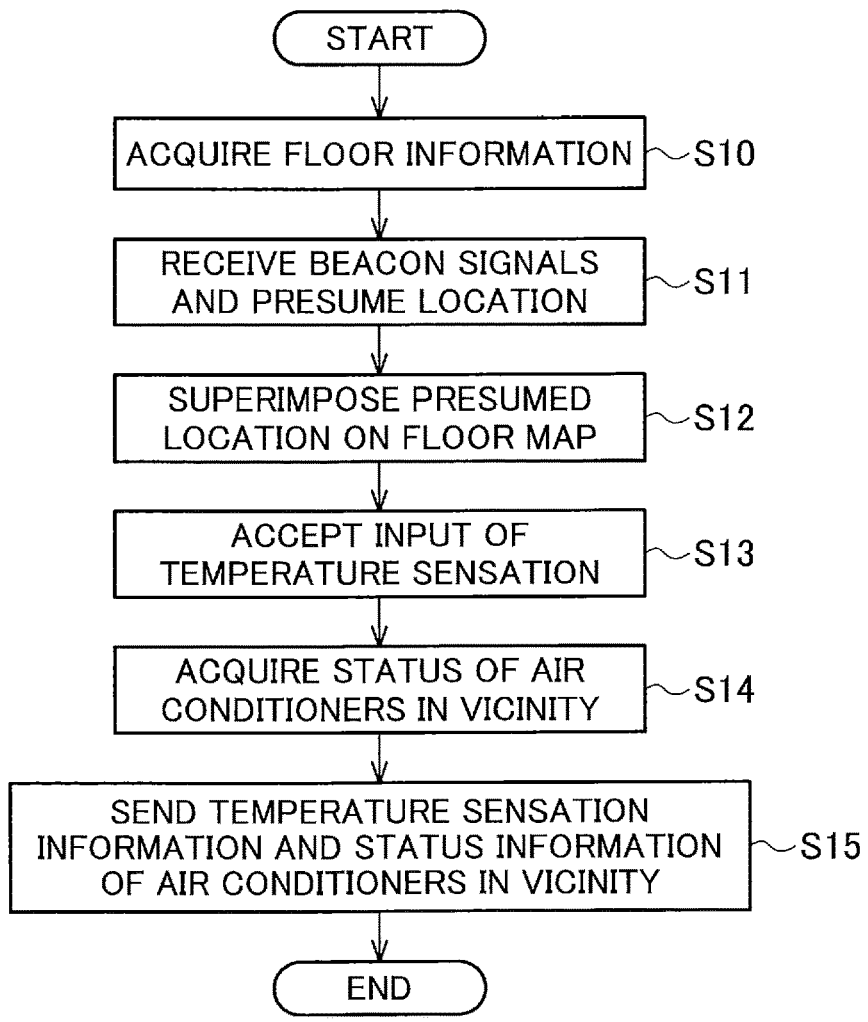
FIG. 6 is a flowchart illustrating the operation of an operation terminal.

FIG. 6 is a flowchart illustrating the operation of an operation terminal 130.

First, the location presumption unit 137 of the operation terminal 130 acquires floor information, which is information related to a predetermined place, by downloading the floor information from the air conditioning controller 110 via the wide-area terminal communication unit 131 (step S10). For example, the user of the operation terminal 130 can designate the floor of the building where the user is present to the air conditioning controller 110 to download the floor information of the designated floor. Specifically, the floor information is information indicating at least a floor map, which is map information indicating at least the installation locations of the air conditioners 150, the shape and size of the floor, and the locations of the walls and windows on the floor, and air conditioning areas determined by a predetermined method.

The local terminal communication unit 132 of the operation terminal 130 receives beacon signals sent by radio from all air conditioners 150 installed on the floor, and measures the radio wave intensities of the beacon signals. The location presumption unit 137 of the operation terminal 130 presumes the location of the operation terminal 130 on the basis of the radio wave intensities (step S11).

Specifically, the location presumption unit 137 performs presumption by the following algorithm.

First, the location presumption unit 137 extracts IDs from the beacon signals $Z_1$ to $Z_N$ received during a predetermined time and rearranges the extracted IDs in descending order of radio wave intensity to create ID strings $Y_1$ to $Y_N$. Here, N is the number of air conditioners 150 from which the operation terminal 130 can receive beacon signals, and is an integer of one or more. The ID strings $Y_1$ to $Y_N$ are character strings arranged in descending order of radio wave intensity. For example, $Y_1$ is the ID of the air conditioner 150 corresponding to the strongest radio wave received by the operation terminal 130, and $Y_N$ is the ID of the air conditioner 150 corresponding to the weakest radio wave received by the operation terminals 130.

The location presumption unit 137 then disposes a predetermined number (for example, 100) of candidate locations within a predetermined radius (for example, 5 m) centered on the last presumed location (also referred to as the last location) in the floor map included in the floor information acquired in step S10. In the case of the first presumption, the location presumption unit 137 may set a predetermined origin as the last presumed location.

The location presumption unit 137 then calculates the distance from each candidate location to each air conditioner 150 on the floor and rearranges the IDs in ascending order of distance, to create ID strings $X_{i1}$ to $X_{iN}$. Here, i is an identification number for identifying a candidate location, and it is assumed that a different identification number is assigned to each candidate location. For example, $X_{i1}$ is the ID of the air conditioner 150 closest to the candidate location identified by the identification number i, and $X_{iN}$ is the ID of the air conditioner 150 farthest from the candidate location identified by the identification number i.

The location presumption unit 137 calculates the distances between the ID strings $Y_1$ to $Y_N$ and the respective ID strings $X_{i1}$ to $X_{iN}$. To calculate the distance here means, for example, to calculate the Levenshtein distance. The Levenshtein distance is a value representing the degree to which two character strings differ.

The location presumption unit 137 calculates the distances for all candidate locations and selects the closest candidate location as the final presumed location. In other words, the location presumption unit 137 selects the candidate location that best matches the radio wave intensity of the beacon signal out of the set candidate locations, as the presumed location. For the distance calculation, a template matching calculation method, such as a dynamic programming (DP) matching method may be used.

As described above, the location presumption unit 137 presumes, as the current location, a candidate location at which order of the air conditioners 150 arranged in ascending order of distance to the air conditioners 150 and the order of the air conditioners 150 arranged in descending order of radio wave intensities are most similar to each other. Specifically, the location presumption unit 137 presumes the candidate location at which the character string of air conditioner identifiers arranged in ascending order of distance to the air conditioners 150 is most similar to the character string of air conditioner identifiers arranged in descending order of radio wave intensity, to be the current location. The degree of similarity between the character strings may be determined by the Levenshtein distance.

Figure 7:
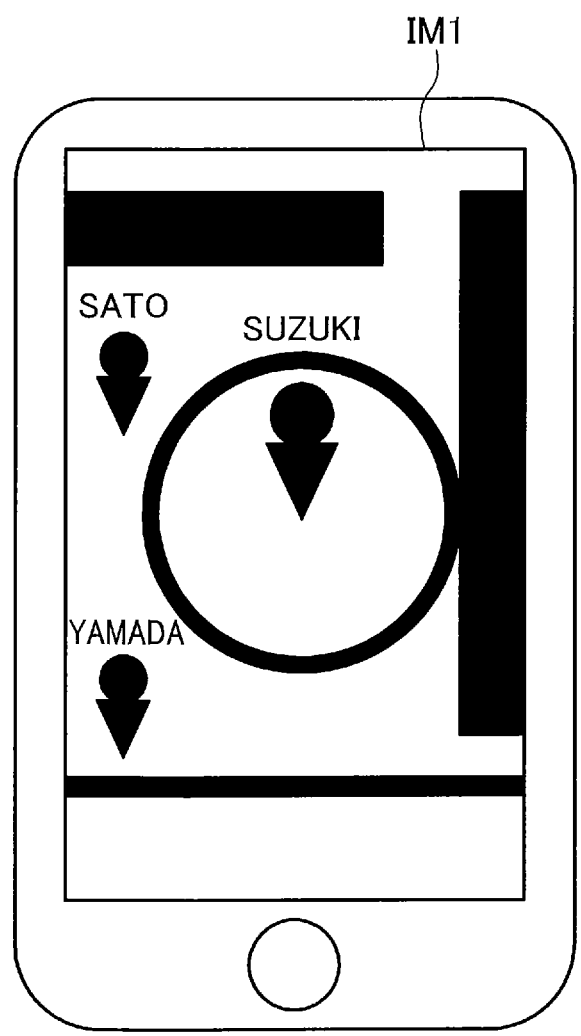
FIG. 7 is a schematic diagram illustrating an example of a presumed location display screen image.

The location presumption unit 137 then causes the display unit 133 to display the presumed location (step S12). Specifically, the location presumption unit 137 causes the display unit 133 to display the floor map with the user icons superimposed at the presumed locations. The icon is a symbol or a figure. FIG. 7 is a schematic diagram illustrating an example of a presumed location display screen image. Here, a presumed location display screen image IM1, such as that illustrated in FIG. 7, appears on the display unit 133.

Figure 8:
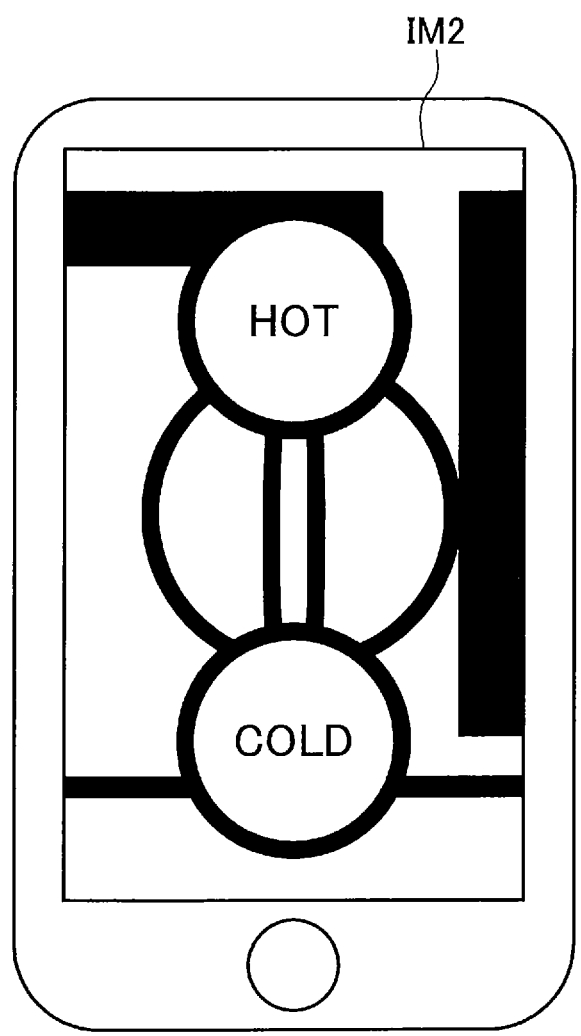
FIG. 8 is a schematic diagram illustrating an example of a temperature sensation input screen image.

The user then inputs the current temperature sensation via the input unit 134 of the operation terminal 130 (step S13). For example, the terminal comprehensive control unit 138 of the operation terminal 130 causes the display unit 133 to display a temperature sensation input screen image IM2, such as that illustrated in FIG. 8, and accepts an input of the temperature sensation felt by the user via the input unit 134.

The terminal comprehensive control unit 138 then acquires the status information from an air conditioner 150 capable of communication via the local terminal communication unit 132 (step S14). Specifically, the status information includes set temperature, intake temperature, operating state, air volume, wind direction, etc. The status information also includes the ID of the air conditioner 150 that has sent the status information.

The terminal comprehensive control unit 138 then sends the presumed location information indicating the location presumed in step S11, the temperature sensation information indicating the temperature sensation input in step S13, and the status information acquired in step S14 to the air conditioning controller 110 via the wide-area terminal communication unit 131 (step S15).

Through the above operation, the presumed locations of the operation terminals 130 used by the users are determined, and the presumed locations are collected by the air conditioning controller 110. The pieces of presumed location information of the operation terminals 130 are uploaded to the air conditioning controller 110. Thus, the air conditioning controller 110 can determine the location of each operation terminal 130, in other words, the locations of the users carrying the operation terminals 130.

Figure 9:
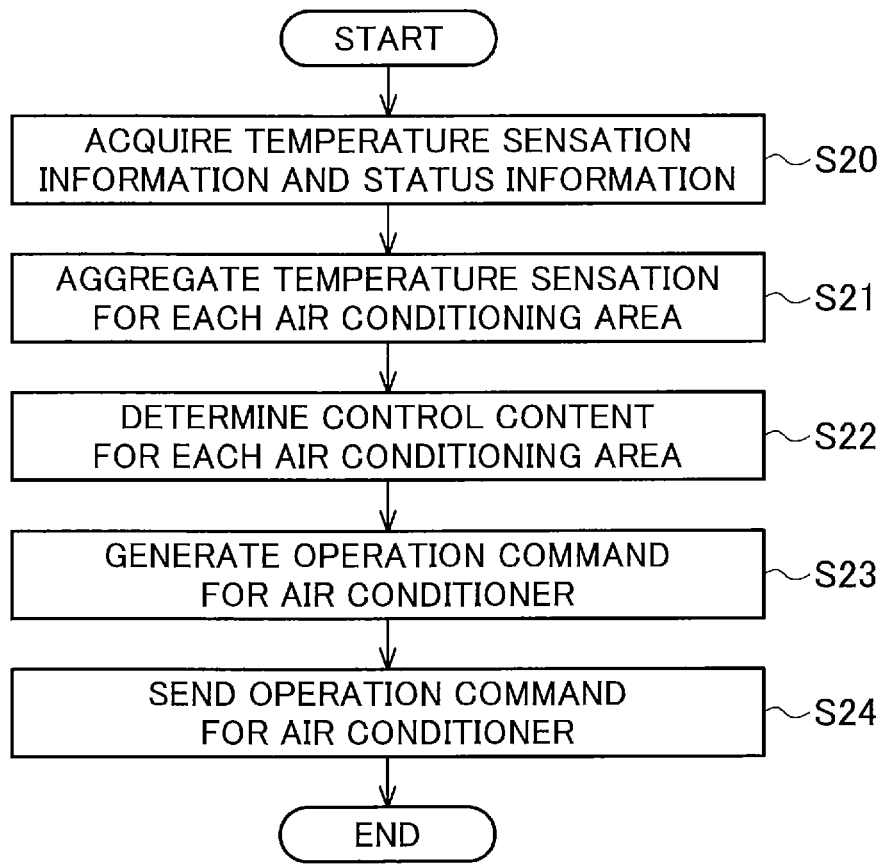
FIG. 9 is a flowchart illustrating the operation of an air conditioning controller.

FIG. 9 is a flowchart illustrating the operation of the air conditioning controller 110.

First, the air conditioning control rule generating unit 114 of the air conditioning controller 110 acquires the temperature sensation information, the status information, and the presumed location information from the operation terminals 130 via the device communication unit 111 (step S20).

The air conditioning control rule generating unit 114 then counts the temperature sensations in the respective air conditioning area (step S21). For example, the air conditioning control rule generating unit 114 specifies the operation terminals 130 located in each air conditioning area by the presumed locations indicated in the presumed location information. The air conditioning control rule generating unit 114 then totals, for each air conditioning area, the number of responses, i.e., hot or cold, indicated in the temperature sensation information sent by the operation terminals 130. Specifically, the air conditioning control rule generating unit 114 totals the number of persons A1 who responded as "hot" and the number of persons B1 who responded as "cold" in each air conditioning area. When B1 is larger than A1, the air conditioning control rule generating unit 114 determines the collective response of the corresponding air conditioning area to be "cold" when B1 is larger than A1, "hot" when B1 is smaller than A1, and "none" when B1 equals A1.

The air conditioning control rule generating unit 114 then determines the control content of the air conditioner 150 in each air conditioning area in accordance with the collective response for each corresponding air conditioning area (step S22). For example, when the collective response is "hot," the air conditioning control rule generating unit 114 lowers the set temperature by a predetermined temperature (for example, one degree), and when the collective response is "cold," raises the set temperature by a predetermined temperature (for example, one degree). When the collective response is "none," the air conditioning control rule generating unit 114 does not change the set temperature. The air conditioning control rule generating unit 114 executes this process for all air conditioning areas and determines the control content of the air conditioners 150 in all air conditioning areas.

The air conditioning control rule generating unit 114 then generates an operation command indicating the control content in accordance with the control content determined in step S22 for the air conditioner 150 whose set temperature is to be changed (step S23). Here, the air conditioning control rule generating unit 114 may change the set temperature of the air conditioner 150 in operation by referring to the status information.

The air conditioning control rule generating unit 114 then sends the operation command and user information indicating the locations and names of other users to the corresponding operation terminals 130 via the device communication unit 111 (step S24). For the operation terminals belonging to air conditioning areas in which the set temperature is not to be changed, the air conditioning control rule generating unit 114 may send user information without sending the operation command.

As for user names, the name of the user of the operation terminal 130 may be included in the presumed location information, or user name information associating the operation terminals 130 with the names of the users may be stored in a storage unit (not illustrated) of the air conditioning controller 110.

The operation terminals 130 may periodically send requests to the air conditioning controller 110, and the air conditioning controller 110 may send operation commands or the like to the operation terminals 130 in response to the requests.

Through the above operation, the control content of the air conditioner 150 is determined by the air conditioning controller 110 in accordance with the presumed location information, the temperature sensation information, and the status information uploaded from the operation terminals 130. When no one has input temperature sensation information, the collective response is determined to be "none," and the air conditioning control is not changed.

Figure 10:
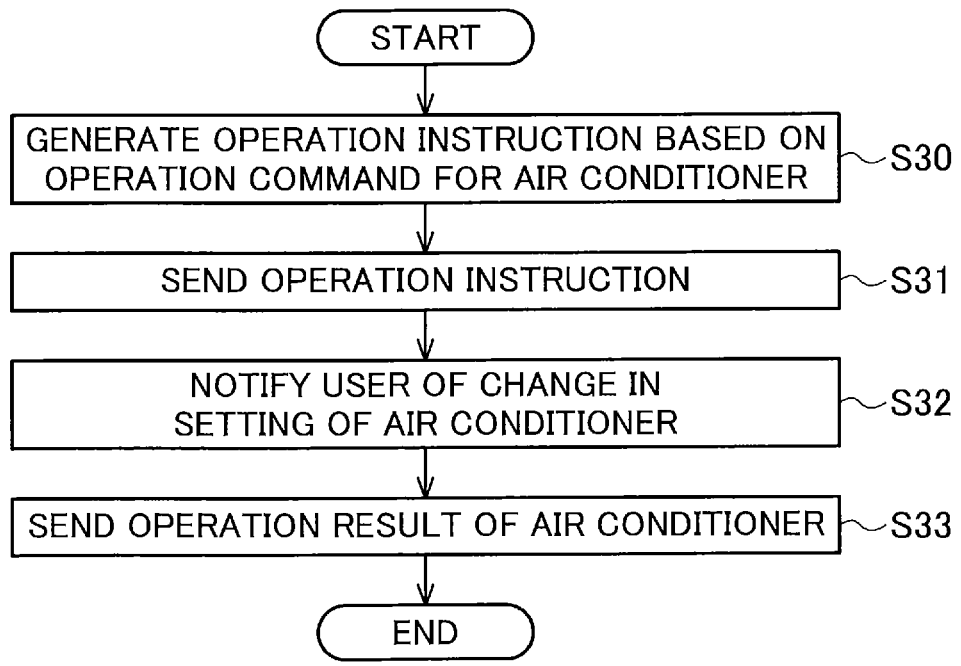
FIG. 10 is a flowchart illustrating the operation of an operation terminal when it receives an operation command.

FIG. 10 is a flowchart illustrating the operation of an operation terminal 130 when an operation command is received.

First, the terminal comprehensive control unit 138 of the operation terminal 130 acquires an operation command from the air conditioning controller 110 via the wide-area terminal communication unit 131 and generates an operation instruction to the corresponding air conditioner 150 in accordance with the operation command (step S30). It is assumed that the operation command indicates the ID of the air conditioner 150 to be controlled.

The terminal comprehensive control unit 138 then sends the generated operation instruction to the corresponding air conditioner 150 via the local terminal communication unit 132 (step S31).

The terminal comprehensive control unit 138 then causes the display unit 133 to display an operation result screen image, which is a screen image indicating that the air conditioner 150 has been operated, and notifies the user of the operation result (step S32).

The terminal comprehensive control unit 138 then sends operation result information indicating the operation result of the air conditioner 150 to the air conditioning controller 110 (step S33). Specifically, the operation result information indicates "success" when the operation succeeds and "failure" when the operation fails. Furthermore, the terminal comprehensive control unit 138 acquires the current status of the air conditioner 150 via the local terminal communication unit 132 and generates status information indicating the acquired status. The terminal comprehensive control unit 138 then sends the generated status information to the air conditioning controller 110.

Through the above operation, the control content of the air conditioner 150 coincides with that determined by the air conditioning controller 110.

As illustrated in FIGS. 9 and 10, each of the operation terminals 130 accepts an input of the temperature sensation and sends the current location and the temperature sensation information indicating the input temperature sensation to the air conditioning controller 110, so that the air conditioning controller 110 can specify the operation terminals 130 belonging to the respective air conditioning areas on the basis of to which of the air conditioning areas the acquired current locations belong to, and can determine the control content of one air conditioner installed in one air conditioning area out of the air conditioning areas based on the temperature sensation information sent by an operation terminal 130 belonging to the one air conditioning area. The control content determined in this way is reported to one operation terminal 130 belonging to the one air conditioning area via the device communication unit 111, and the terminal comprehensive control unit 138 of the one operation terminal 130 can control the operation of the one air conditioner 150 in accordance with the determined control content.

Explained above are the operation steps of an operation terminal 130 detecting a location and accepting a temperature sensation input from a user and this information being reflecting to the control content of the air conditioner 150.

Figure 11:
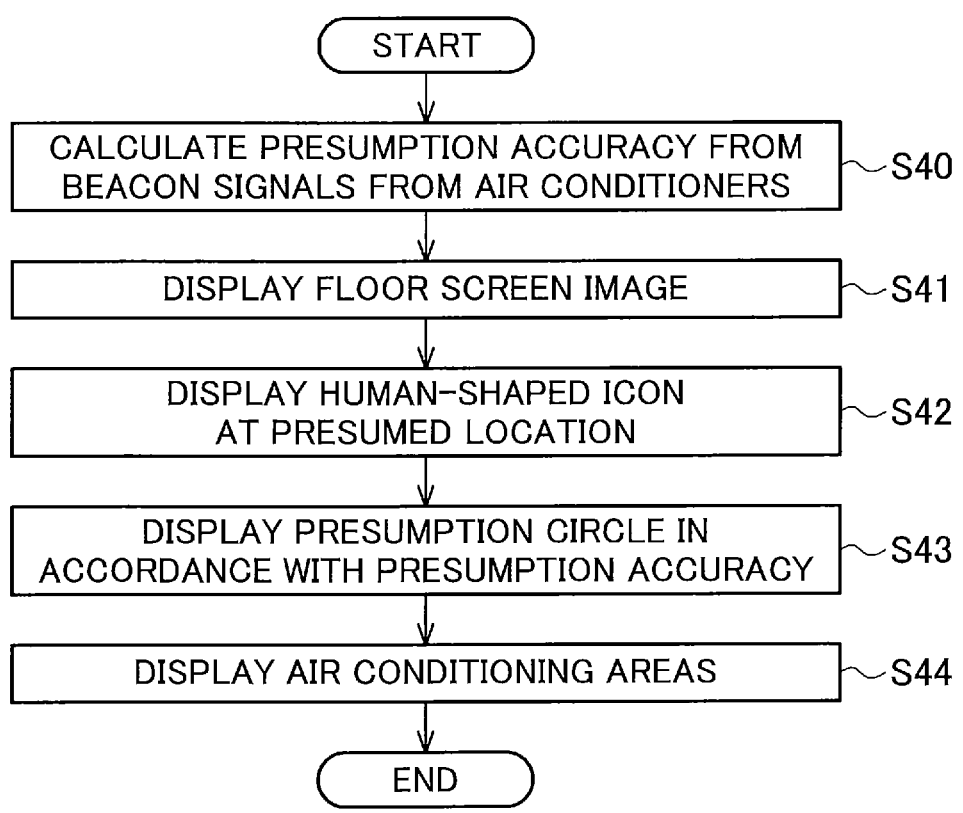
FIG. 11 is a flowchart illustrating the operation when an operation terminal presumes a location.

FIG. 11 is a flowchart illustrating the operation when an operation terminal 130 presumes a location.

First, the location presumption unit 137 of the operation terminal 130 acquires the number of beacon signals received by the local terminal communication unit 132 within a predetermined time and the radio wave intensities of the beacon signals measured by the local terminal communication unit 132, and calculates a presumption error of the location presumption (step S40).

Specifically, the location presumption unit 137 classifies the radio wave intensities of the beacon signals for each of the air conditioners 150 and extracts the strongest radio wave intensity for each air conditioner 150, to generate a radio wave intensity group. The location presumption unit 137 then rearranges the radio wave intensities in the radio wave intensity group in descending order of radio wave intensity, i.e., in the order of a maximum intensity $R_1$, a second intensity $R_2$, a third intensity $R_3$, . . . and an N-th intensity RN. The location presumption unit 137 then obtains the presumption accuracy by the following equation (1).

$$\text{Presumption error } [m] = 1 \div \{A_1 \times (R_1 - R_2) + A_2 \times (R_2 - R_3) + \ldots + A_{N-1} \times (R_{N-1} - RN)\} \quad (1)$$

where $A_1$ to $A_{N-1}$ are predetermined weight parameters, and $A_1 > A_2 > \ldots > A_{N-1}$. In other words, the stronger the radio wave intensity, the larger the value. The unit of presumption error is meters.

As indicated in the equation (1), the presumption error increases as the difference between two consecutive radio wave intensities in the arranged radio wave intensities increases. Thus, when beacon signals having similar radio wave intensities are received from multiple air conditioners 150, the accuracy of location presumption deteriorates. In other words, the presumption error decreases as the operation terminal 130 is close to an air conditioner 150 and is farther away from the second closest air conditioner 150.

The location presumption unit 137 may calculate the presumption error by the following equation (2).

$$\text{Presumption error } [m] = 1 \div (R_1 - R_2) \quad (2)$$

The location presumption unit 137 then causes the display unit 133 to display a floor screen image, which is a floor plan (step S41). Specifically, the location presumption unit 137 generates a plan view of the entire floor in accordance with the shape and size of the floor by referring to the floor map indicated in the floor information acquired from the air conditioning controller 110, and generates a floor screen image by causing the locations of the walls to appear as monochromatic polygons and arranging predetermined icons at the locations of the air conditioners 150.

Figure 12:
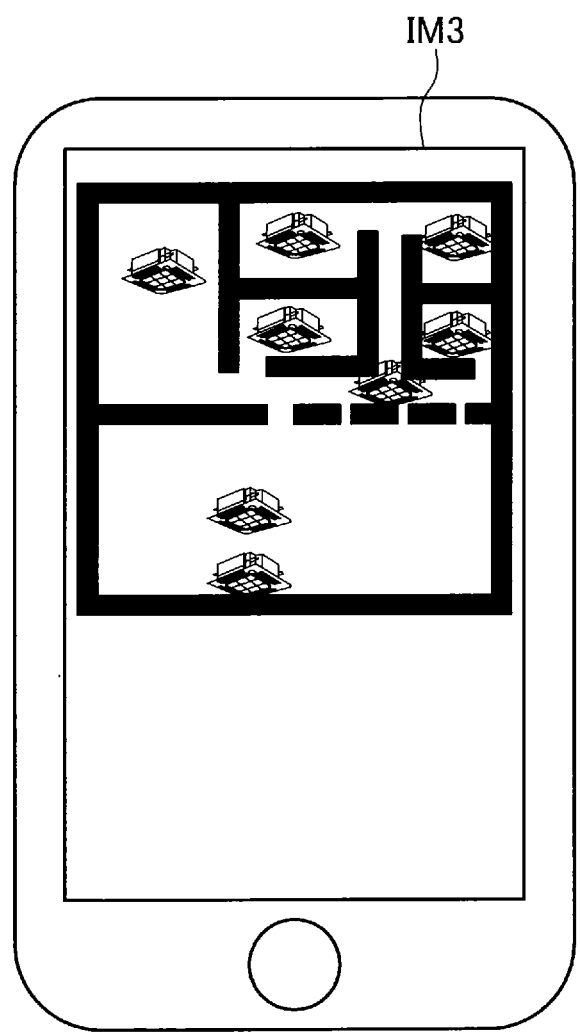
FIG. 12 is a schematic diagram illustrating an example of a floor screen image.

For example, the display unit 133 displays a floor screen image IM3, such as that illustrated in FIG. 12.

The location presumption unit 137 then superimposes an icon indicating the user of the operation terminal 130 and the name of the users on the floor screen image at the presumed location determined in step S11 of FIG. 6, and also superimposes icons of other users and the names of these users at the corresponding locations in accordance with the user information sent by the air conditioning controller 110 (step S42). The icons indicating the user and the user name may be displayed at a location close to the presumed location. In other words, they may be displayed at a location determined on the basis of the presumed location.

The location presumption unit 137 then superimposes, on the floor screen image, a circle that becomes larger as the presumption error presumed in step S40 becomes larger (step S43). As mentioned above, since the unit of the presumption error is meters, the location presumption unit 137 may calculate the radius of the circle by multiplying the presumption error by the scale of the floor screen image displayed on the display unit 133. This causes the display unit 133 to display a presumed location display screen image IM1, such as that illustrated in FIG. 7. Note that the magnification ratios of the screen images differ between FIGS. 7 and 12.

In the presumed location display screen image IM1, the circumferential portion is indicated by an opaque frame line, and the inside of the circle may be filled with a predetermined translucent color.

As described above, by displaying a large presumption error when the radio wave intensities of the received beacon signals are similar, and displaying a small presumption error when the difference in the radio wave intensities is large, the user can recognize the accuracy of the presumed location.

The location presumption unit 137 then causes the display unit 133 to display the air conditioning areas indicated in the floor information acquired from the air conditioning controller 110 (step S44).

Figure 13:
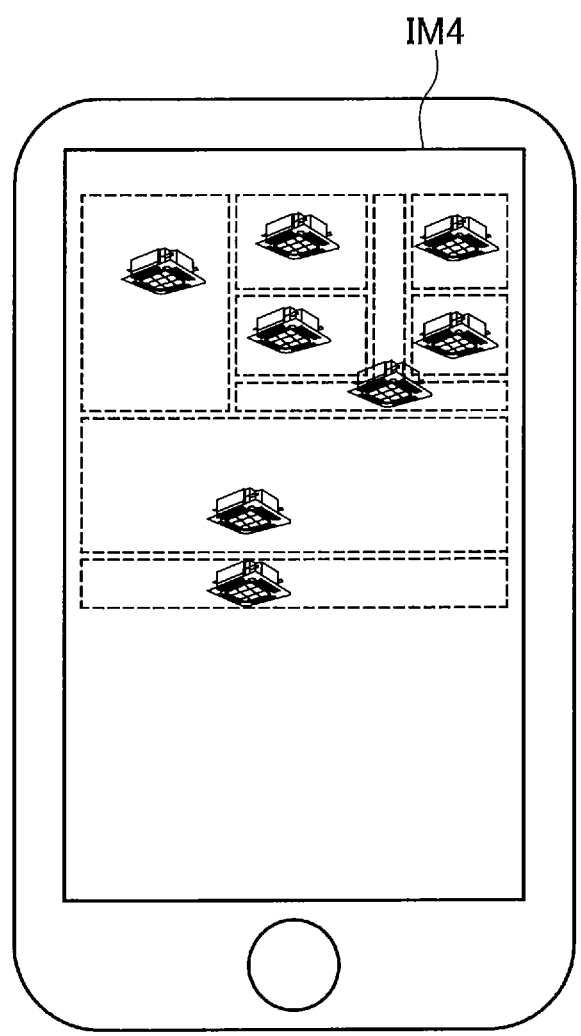
FIG. 13 is a schematic diagram illustrating an example of an air conditioning area screen image.

FIG. 13 is a schematic diagram illustrating an example of an air conditioning area screen image displayed on the display unit 133.

For example, in an air conditioning area screen image IM4 illustrated in FIG. 13, the outer peripheries of the air conditioning areas are indicated by broken lines. The inside of the air conditioning areas may be filled with a translucent color. The air conditioning areas may be superimposed on the floor screen image IM3 illustrated in FIG. 12. In such a case, in order to distinguish the walls from the air conditioning areas, it is desirable to make the air conditioning areas easily visible by, for example, lightening the color of the walls and darkening the color of the broken lines indicating the air conditioning areas.

The screen images IM1 to IM4 displayed on the display unit 133 may be switched in response to an instruction from the user input to the input unit 134 or may be automatically switched.

Figure 14:
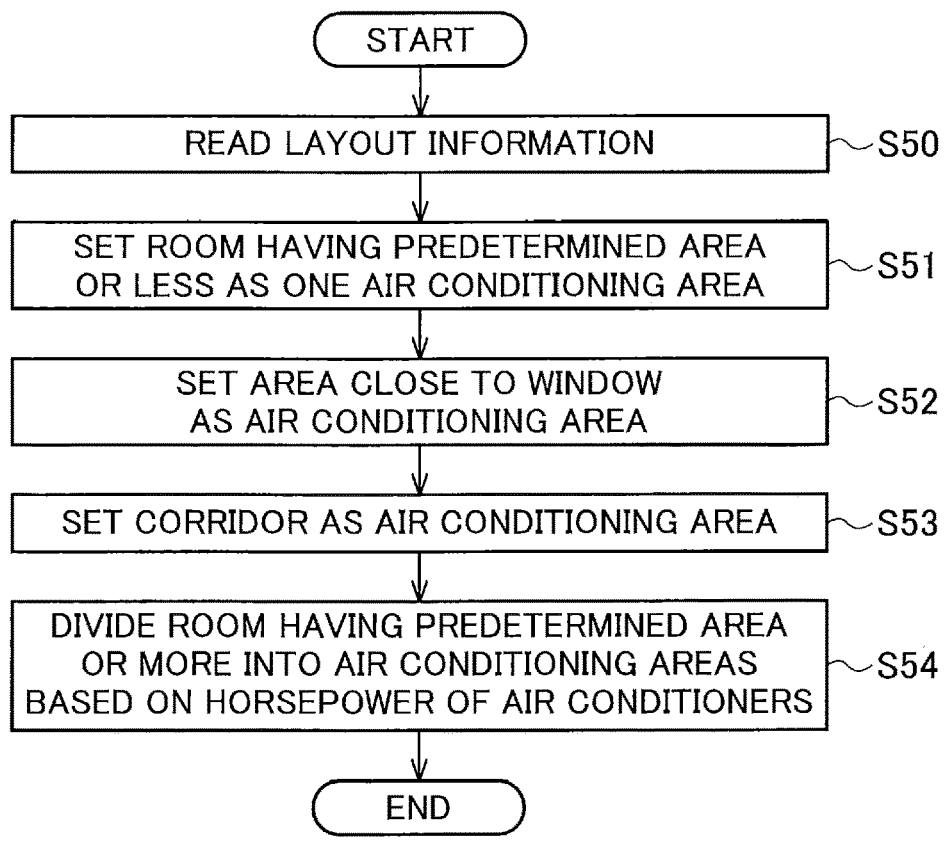
FIG. 14 is a flowchart illustrating the operation of an air conditioning controller specifying air conditioning areas.

FIG. 14 is a flowchart illustrating the operation of the air conditioning controller 110 specifying air conditioning areas.

First, the air conditioning control rule generating unit 114 of the air conditioning controller 110 reads the locations of shielding objects, such as walls and doors, the locations of windows, and the locations of the air conditioners 150 on the floor from the layout information stored in the BIM database 112 (step S50).

Next, the air conditioning control rule generating unit 114 recognizes a space separated by the shielding objects as one room on the floor, and defines a room having a predetermined area or less as one air conditioning area (step S51). The predetermined area is, for example, 25 square meters. Such an air conditioning area is also referred to as a small room area.

Next, the air conditioning control rule generating unit 114 defines an area at a predetermined distance from a window as one air conditioning area in a region not determined as an air conditioning area on the floor (step S52). The predetermined distance is, for example, three meters. Such an air conditioning area is also referred to as a window area.

Next, the air conditioning control rule generating unit 114 defines one connected space having a predetermined width or less as one air conditioning area in a region not determined as an air conditioning area on the floor (step S53). The predetermined width is, for example, two meters. Such an air conditioning area is also referred to as a corridor area.

The air conditioning control rule generating unit 114 divides the remaining area that has not been determined as an air conditioning area on the floor into air conditioning areas of the respective air conditioners 150 on the basis of the horsepower of the air conditioners 150. Specifically, this is executed as follows.

First, the air conditioning control rule generating unit 114 calculates the air conditioner cover size, which is the size of the remaining area covered by one air conditioner 150 disposed in the remaining area, by the following equation (3).

$$\text{Air conditioner cover size } [m] = \text{horsepower of air conditioner} \times D \qquad (3)$$

where D is a predetermined value. The unit of air conditioner cover size is meters.

Subsequently, the air conditioning control rule generating unit 114 draws a square centered on each air conditioner 150 in the remaining area on the basis of the calculated air conditioner cover size, and defines the squares as air conditioning areas.

Figure 15:
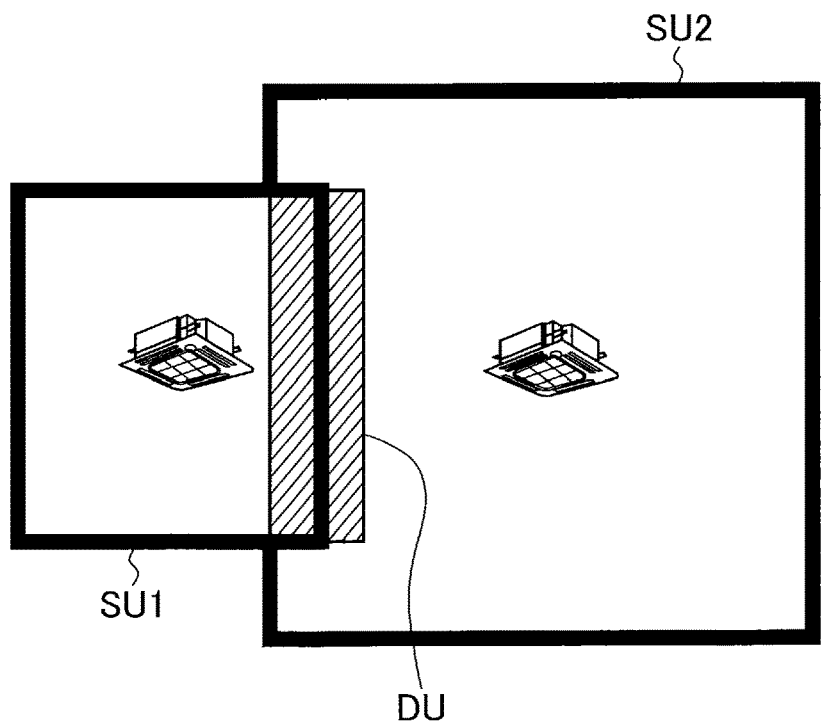
FIG. 15 is a schematic diagram for explaining air conditioning areas obtained by division.

Here, for example, as illustrated in FIG. 15, if a square SU1 and a square SU2 overlap each other, the overlapping portion DU indicated by hatched area is equally divided and incorporated into the respective air conditioning areas. This generates a polygonal air conditioning area.

In this way, the floor is divided into air conditioning areas. Note that even after the above steps, some areas may not be included in the air conditioning areas. In such a case, these areas are defined as "un-air-conditioned areas."

Through the above operation, the air conditioning control rule generating unit 114 automatically divides the floor indicated in the floor information into air conditioning areas. As a result, when the location of an operation terminal 130 is presumed, the air conditioning area to which the operation terminal 130 belongs is specified, and the air conditioner 150 to be controlled can be automatically determined.

In this way, the current location of the operation terminal 130 can be readily presumed on the basis of the last presumed location and the radio wave intensity of the beacon signals.

As described above, the locations of the users holding the operation terminals 130 on the floor can be readily confirmed by viewing the screens of the operation terminals 130.

Since a circle indicating the presumption error is displayed, the user can intuitively understand how probable the displayed location is. Since the size of the circle indicating the presumption error changes in accordance with the radio wave intensity, the user can understand in real time a probable situation and an improbable situation.

Since the user name of the operation terminal 130 is displayed on the screen, the user can readily specify their location.

Since the locations and names of nearby users are displayed, it is possible to confirm who is in the same air conditioning area by viewing the screen.

By automatically obtaining the air conditioning areas by division from the BIM data and displaying the air conditioning areas on the operation terminals carried by the respective users, the users can readily confirm which air conditioning area they belong to.

A user can set the temperature around themselves to a comfortable temperature by simply inputting the temperature sensation they are feeling to the operation terminal 130 since the air conditioners 150 in the vicinity of the user are automatically operated.

What is claimed is:

1. An air conditioning system having
a plurality of air conditioners installed in a predetermined place and
an operation terminal to communicate with the air conditioners by radio signals, wherein,
each of the air conditioners comprises a first radio communication device to send a beacon signal,
the operation terminal comprises:
 a second radio communication device to receive two or more beacon signals send by two or more air conditioners of the air conditioners; and
 processing circuitry to presume a current location by using two or more radio wave intensities measured from each of the two or more beacon signals and a last location, the current location being a location in which the operation terminal is currently located, the last location being a location presumed last as a location of the operation terminal, wherein
the processing circuitry
 sets a plurality of predetermined candidate locations within a predetermined range from the last location,
 selects, from the plurality of candidate locations, one candidate location having two or more distances calculated for each of the two or more air conditioners best matching the two or more radio wave intensities, and
 presumes the one candidate location as the current location.

2. The air conditioning system according to claim 1, wherein
the processing circuitry selects, as the one candidate location, a candidate location at which an order of the two or more air conditioners arranged in ascending order of distance to the two or more air conditioners and an order of the two or more air conditioners arranged in descending order of radio wave intensity are most similar to each other.

3. The air conditioning system according to claim 1, wherein,
each of the two or more beacon signals includes an air conditioner identifier, the air conditioner identifier being identification information for identifying each of the two or more air conditioners, and
the processing circuitry selects, as the one candidate location, a candidate location at which a character string arranging the air conditioner identifiers of the two or more air conditioners in ascending order of distance to the two or more air conditioners and a character string arranging the air conditioner identifiers of the two or more air conditioners in descending order of radio wave intensity are most similar to each other.

4. The air conditioning system according to claim 3, wherein
the processing circuitry determines a degree of similarity between the character strings by a Levenshtein distance.

5. The air conditioning system according to claim 1, wherein,
the operation terminal further comprises a display,
the processing circuitry generates a screen image indicating at least a portion of the predetermined place and the current location, and
the display displays the screen image.

6. The air conditioning system according to claim 5, wherein,
the second radio communication device receives the beacon signals sent by the two or more air conditioners during a predetermined time period, and
the processing circuitry p2 generates a radio wave intensity group by specifying the strongest radio wave intensity for each of the two or more air conditioners from the radio wave intensities measured from the beacon signals, and
shows a circle on the screen image, the circle becoming larger as a difference obtained by subtracting the second strongest radio wave intensity from the strongest radio wave intensity in the radio wave intensity group becomes larger.

7. The air conditioning system according to claim 5, wherein,
the second radio communication device receives the beacon signals sent by the two or more air conditioners during a predetermined time period, and
the processing circuitry
 generates a radio wave intensity group by specifying the strongest radio wave intensity for each of the two or more air conditioners from the radio wave intensities measured from the beacon signals,
 performs a process of calculating the difference between each two consecutive radio wave intensities in ascending order of radio wave intensity when the radio wave intensities in the radio wave intensity group are arranged in descending order of radio wave intensity, up to the second strongest radio wave intensity, and
 shows a circle on the screen image, the circle becoming larger as the sum of all calculated differences becomes larger.

8. The air conditioning system according to claim 5, wherein,
the operation terminal comprises a storage device stores a user name of a user using the operation terminal, and
the processing circuitry indicates the user name in association with the current location on the screen image.

9. The air conditioning system according to claim 5, further comprising:

a plurality of operation terminals, each operation terminal being identical to the operation terminal; and an air conditioning controller to communicate with the operation terminals, wherein, each of the operation terminals further comprises:
a storage device stores a user name of a user using the operation terminal, and
a first communication device sends the current location together with the user name to the air conditioning controller and receives the current location and the user name of another operation terminal out of the plurality of operation terminals, and the processing circuitry of each of the operation terminals
indicates, on the screen image, the user name stored in the storage device of each of the operation terminals in association with the current location presumed by the processing circuitry of each of the operation terminals, and
indicates, on the screen image, the user name received by the first communication device of each of the operation terminals in association with the current location received by the first communication device of each of the operation terminals.

10. The air conditioning system according to claim 5, further comprising:
an air conditioning controller to communicate with the operation terminal, wherein,
the operation terminal further comprises a first communication device to receive, from the air conditioning controller, information indicating a plurality of air conditioning areas obtained by dividing the predetermined place, and
the processing circuitry shows at least one of the air conditioning areas on the screen image.

11. The air conditioning system according to claim 1, further comprising:
a plurality of operation terminals, each operation terminal being identical to the operation terminal; and
an air conditioning controller, wherein,
each of the operation terminals further comprises:
an input device to accept input of a temperature sensation; and
a first communication device to send the current location to the air conditioning controller and send temperature sensation information indicating the input temperature sensation to the air conditioning controller, and
the processing circuitry controls operation of any one of the air conditioners via the second radio communication device,
the air conditioning controller comprises:
a second communication device to communicate with the operation terminals; and
a storage device to store information indicating the predetermined place and the air conditioning areas obtained by dividing the predetermined place, and
the processing circuitry acquires the current location from the operation terminals via the second communication device,
specifies the operation terminal belonging to each of the air conditioning areas based on which one of the air conditioning areas the current location belongs to,
determines a control content of one air conditioner disposed in one air conditioning area out of the air conditioning areas based on temperature sensation information sent by the operation terminal belonging to the one air conditioning area, and
notifies one operation terminal belonging to the one air conditioning area of the determined control content via the second communication device, and
the processing circuitry of the one operation terminal controls operation of the one air conditioner in accordance with the determined control content.

12. An operation terminal comprising:
a radio communication device to receive two or more beacon signals sent by two or more air conditioners installed in a predetermined place; and
processing circuitry to presume a current location in which the operation terminal is currently located by using two or more radio wave intensities measured from each of the two or more beacon signals and a last location presumed last as a location of the operation terminal, wherein
the processing circuitry
sets a plurality of predetermined candidate locations within a predetermined range from the last location,
selects, from the plurality of candidate locations, one candidate location having two or more distances calculated for each of the two or more air conditioners best matching the two or more radio wave intensities, and
presumes the one candidate location as the current location.

13. A non-transitory computer-readable medium that stores therein a program that causes a computer to execute processes of:
receiving two or more beacon signals sent by two or more air conditioners installed in a predetermined place; and
presuming a current location in which the operation terminal is currently located by using two or more radio wave intensities measured from each of the two or more beacon signals and a last location presumed last as a location of the operation terminal, wherein
presuming the current location includes
setting a plurality of predetermined candidate locations within a predetermined range from the last location,
selecting, from the plurality of candidate locations, one candidate location having two or more distances calculated for each of the two or more air conditioners best matching the two or more radio wave intensities, and
presuming the one candidate location as the current location.

* * * * *